US010055229B2

(12) United States Patent
Lyberis

(10) Patent No.: US 10,055,229 B2
(45) Date of Patent: Aug. 21, 2018

(54) CONTROLLING PROCESSING OF INSTRUCTIONS IN A PROCESSING PIPELINE

(71) Applicant: ARM LIMITED, Cambridge (GB)

(72) Inventor: Spyros Lyberis, Cambridge (GB)

(73) Assignee: ARM Limited, Cambridge (GB)

( * ) Notice: Subject to any disclaimer, the term of this patent is extended or adjusted under 35 U.S.C. 154(b) by 208 days.

(21) Appl. No.: 15/224,802

(22) Filed: Aug. 1, 2016

(65) Prior Publication Data

US 2017/0212761 A1 Jul. 27, 2017

(30) Foreign Application Priority Data

Jan. 21, 2016 (GR) .............................. 20160100017

(51) Int. Cl.
*G06F 9/30* (2018.01)
*G06F 9/38* (2018.01)
(52) U.S. Cl.
CPC ........ *G06F 9/3838* (2013.01); *G06F 9/30032* (2013.01); *G06F 9/30072* (2013.01); *G06F 9/3836* (2013.01)

(58) Field of Classification Search
None
See application file for complete search history.

(56) References Cited

U.S. PATENT DOCUMENTS

| 5,872,948 A * | 2/1999 | Mallick | ................. G06F 9/3836 |
| | | | 712/214 |
| 2014/0281423 A1* | 9/2014 | Caulfield | ............ G06F 9/30079 |
| | | | 712/225 |
| 2016/0170758 A1* | 6/2016 | Col | ......................... G06F 1/324 |
| | | | 712/217 |

* cited by examiner

*Primary Examiner* — John Lindlof
(74) *Attorney, Agent, or Firm* — Nixon & Vanderhye P.C.

(57) ABSTRACT

In a pipeline where first and second instruction slots process first and second instructions in parallel and a duplicated processing resource is provided at both first and second pipeline stages, a second instruction in the second instruction slot requiring the duplicated processing resource is controlled to use the duplicated processing resource at the first pipeline stage when a first number of cycles by which the instruction in the first instruction slot is to be stalled is greater than or equal to a second number of cycles by which the second instruction would be stalled to allow its operand to be available in time for the first pipeline stage.

11 Claims, 5 Drawing Sheets

CONTROLLING PROCESSING OF INSTRUCTIONS IN A PROCESSING PIPELINE

This application claims priority to GR Patent Application No. 20160100017 filed 21 Jan. 2016, the entire content of which is hereby incorporated by reference.

BACKGROUND

Technical Field

The present technique relates to the field of data processing.

Technical Background

A data processing apparatus may have a processing pipeline having a number of pipeline stages for processing instructions. Scheduling of instructions to be processed on the pipeline may consider dependencies or hazards between instructions.

SUMMARY

At least some examples provide an apparatus comprising:
a processing pipeline comprising first and second instruction slots to process first and second instructions in parallel, the processing pipeline comprising a duplicated processing resource provided at both a first pipeline stage and a second pipeline stage subsequent to the first pipeline stage; and
control circuitry to determine, when the second instruction to be processed by the second instruction slot requires the duplicated processing resource, whether to process the second instruction using the duplicated processing resource at the first pipeline stage or the second pipeline stage;
wherein the control circuitry is configured to determine that the second instruction is to be processed using the duplicated processing resource at the first pipeline stage when a first number of cycles by which the first instruction is to be stalled in the first instruction slot is greater than or equal to a second number of cycles by which the second instruction would need to be stalled to allow an operand required for processing the second instruction using the duplicated processing resource to be available by the time the second instruction is at the first pipeline stage.

At least some examples provide a data processing method for a processing pipeline comprising first and second instruction slots to process first and second instructions in parallel, the processing pipeline comprising a duplicated processing resource provided at both a first pipeline stage and a second pipeline stage subsequent to the first pipeline stage;
the method comprising:
when the second instruction to be processed by the second instruction slot requires the duplicated processing resource, determining whether a first number of cycles by which the first instruction is to be stalled in the first instruction slot is greater than or equal to a second number of cycles by which the second instruction would need to be stalled to allow an operand required for processing the second instruction using the duplicated processing resource to be available by the time the second instruction is at the first pipeline stage; and
when the first number of cycles is greater than the second number of cycles, determining that the second instruction should be processed using the duplicated processing resource at the first pipeline stage.

At least some examples provide an apparatus comprising:
means for pipelined processing of instructions, the means for pipelined processing comprising first and second instruction slot means for processing first and second instructions in parallel, the means for pipelined processing comprising a duplicated processing resource provided at both a first pipeline stage and a second pipeline stage subsequent to the first pipeline stage; and
means for determining, when the second instruction to be processed by the second instruction slot means requires the duplicated processing resource, whether to process the second instruction using the duplicated processing resource at the first pipeline stage or the second pipeline stage;
wherein the means for determining is configured to determine that the second instruction is to be processed using the duplicated processing resource at the first pipeline stage when a first number of cycles by which the first instruction is to be stalled in the first instruction slot means is greater than or equal to a second number of cycles by which the second instruction would need to be stalled to allow an operand required for processing the second instruction using the duplicated processing resource to be available by the time the second instruction is at the first pipeline stage.

Further aspects, features and advantages of the present technique will be apparent from the following description of examples, which is to be read in conjunction with the accompanying drawings.

DESCRIPTION OF EXAMPLES

Figure 1:
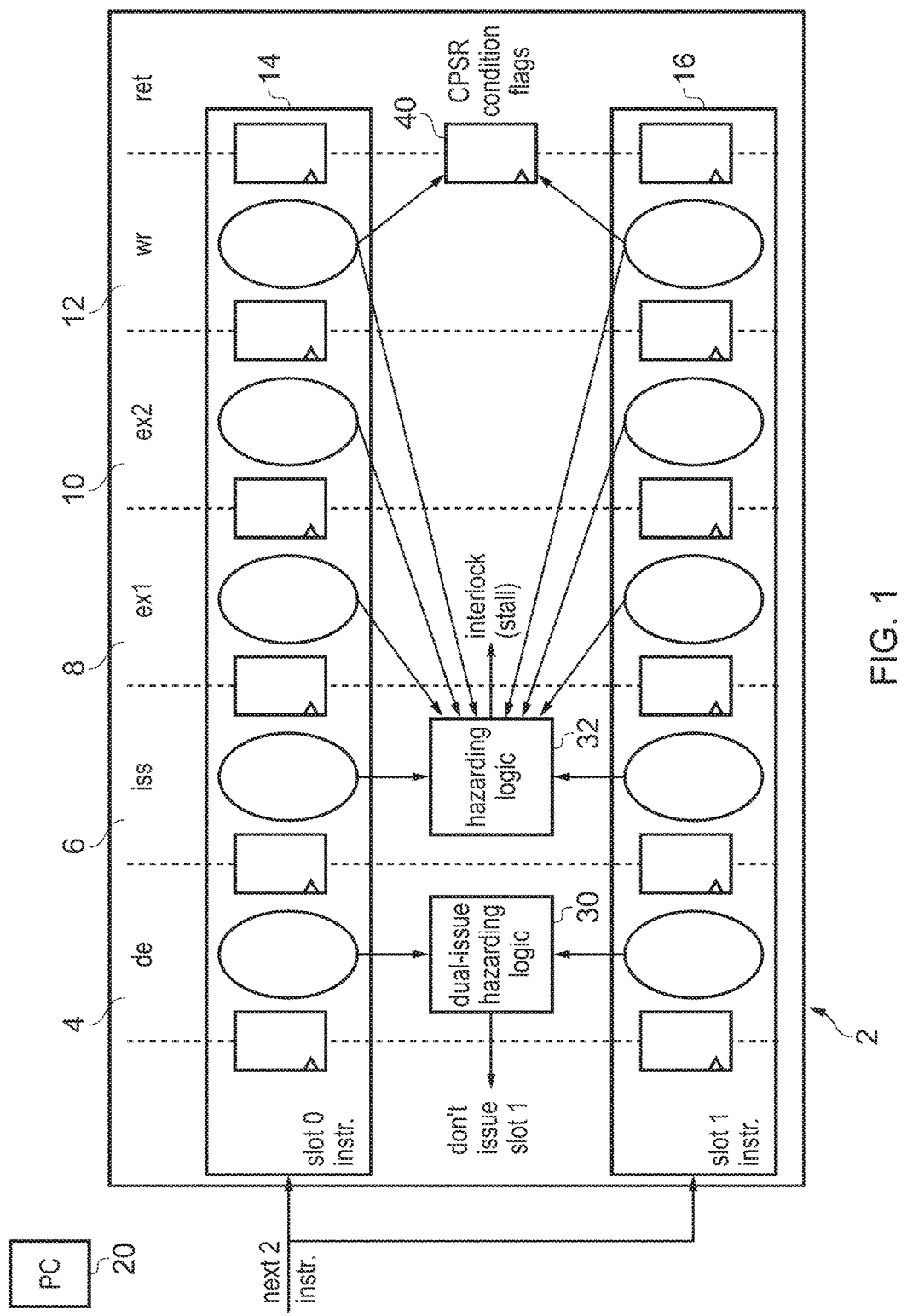
FIG. 1 schematically illustrates an example of a processing pipeline comprising first and second instruction slots for processing first and second instructions in parallel.

A processing pipeline may have first and second instruction slots to process first and second instructions in parallel. This allows a given pipeline stage to be processing multiple instructions in parallel to improve performance compared to a pipeline in which each stage can only process a single instruction at a time.

A processing pipeline may comprise a duplicated processing resource which is provided at both a first pipeline stage and a second pipeline stage subsequent to the first pipeline stage. Hence, when an instruction requires the duplicated processing resource, control circuitry has the freedom to determine whether that instruction should use the duplicated processing resource at the first pipeline stage or the second pipeline stage. If an instruction is processed using the duplicated processing resource at the first pipeline stage, then its result may be available earlier and this may help to avoid potential data dependency hazards with later instructions. This technique of executing a given instruction at an earlier stage can be known as "skewing".

However, using the duplicated processing resource at the first pipeline stage may cause additional hazards if an operand required by the instruction using the duplicated processing resource cannot be available in time for the instruction to reach the first pipeline stage. Therefore, one approach is to consider whether an operand required for processing a given instruction using the duplicated processing resources would be available in time for the instruction reaching the first pipeline stage, and if the operand would be available in time, to use the duplicated processing resource at the first pipeline stage, while if the operand would not be available in time, to control the pipeline to process the instruction using the duplicated processing resource at the second pipeline stage. By using the time taken for the operand to become available to progress the instruction further down the pipeline, then this may free up use of the first pipeline stage for other instructions earlier, which can improve performance.

However, for a processing pipeline having first and second instruction slots to process first and second instructions in parallel, processing of the first instruction processed by the first instruction slot may stall for various reasons, e.g. because there are data dependency hazards between that first instruction and an earlier instruction in the pipeline. If the first instruction stalls, this may also affect the second instruction in the second instruction slot. Therefore, when deciding whether the second instruction to be processed by the second instruction slot should be processed using the duplicated processing resource at the first pipeline stage or the second pipeline stage, it can be useful to consider the number of cycles for which the first instruction is to be stalled in the first instruction slot.

When encountering a second instruction in the second instruction slot which requires the duplicated processing resource, the control circuitry may determine whether a first number of cycles by which the first instruction is to be stalled in the first instruction slot is greater than or equal to a second number of cycles by which the second instruction would need to be stalled to allow an operand required for processing the second instruction using the duplicated processing resource to be available by the time the second instruction is at the first pipeline stage. Even if the second number of cycles is non-zero, so that some stalling of the second instruction would be required in order for its operand to be available by the time it is at the first pipeline stage, if the first number of cycles by which the first instruction is to be stalled in the first instruction slot is equal to or greater than the second number of cycles, then it can be advantageous to process the second instruction using the duplicated processing resource at the first pipeline stage. This allows the result of the second instruction to be available earlier which can help to avoid future stalls caused by data dependency hazards with later instructions requiring the result of the second instruction. In summary, by determining the number of cycles by which the first instruction is to be stalled, and allowing use of the duplicated processing resource in the first pipeline stage for the second instruction when the stall penalty for the second instruction would be less than or equal to the stall penalty for the first instruction, performance can be improved.

Note that the first number of cycles or the second number of cycles can be zero on some instances when the second instruction and the first instruction are processed. For example, if there are no data hazards for the first instruction then the first number of cycles may be zero. If all the operands required for processing the second instruction are already available, or will be available by the time the second instruction is at the first pipeline stage regardless of whether the instruction is stalled, then the second number of cycles may be zero.

Conversely, if the control circuitry determines that the first number of cycles is less than the second number of cycles, then the control circuitry may determine that the second instruction is to be processed using the duplicated processing resource at the second pipeline stage. In this case, using the duplicated processing resource at the first pipeline stage would require a greater stall than is already being made to the first instruction, and so it may be more efficient to progress the second instruction to the second pipeline stage by which time it is more likely that the required operand has become available, and this may avoid an additional stall cycle so that a later instruction can be processed earlier.

The instruction in the first instruction slot may similarly require the duplicated processing resource. If so, then the control circuitry may likewise determine whether the first instruction should be processed using the duplicated processing resource at the first pipeline stage or the second pipeline stage. However, for the first instruction slot, this determination may be independent of whether the second instruction is stalled in the second instruction slot and may instead be based on whether the first instruction would need to be stalled to allow an operand required for processing the first instruction using the duplicated processing resource to be available in time for the first instruction reaching the first pipeline stage. Hence, if the first instruction would need to be stalled to allow its operand to be available in time for it reaching the first pipeline stage, then the first instruction may be processed using the duplicated resource at the second pipeline stage, and otherwise the duplicated resource at the first pipeline stage may be used.

There may be a number of ways of determining the first number of cycles and the second number of cycles. For example, the first number of cycles may be identified based on whether a hazard condition is detected between the first instruction and at least one earlier instruction pending in the pipeline. Which earlier instructions are considered for the hazard comparison may depend, for example, on which stage of the pipeline is the stage where result operands become available for use by earlier pipeline stages, whether any forwarding of operands between stages is provided, which stage of the pipeline is the stage at which the duplicated processing resource appears, and which stage is the stage where instructions are pending when they are checked for hazards. The control circuitry may determine how many additional stall cycles may be required to ensure that the operand is available in time for the first instruction reaching the first pipeline stage that includes the duplicated processing resource.

When the first instruction is stalled by the first number of cycles, the control circuitry may also stall the second instruction by the same first number of cycles. This may make hazarding between instructions in the different instruction slots simpler because a pair of instructions input to the first and second instruction slots at the same time will then stay in step through the rest of the pipeline, and so if at the initial stage of the pipeline the hazard checking circuitry can determine that there is no hazard between the first instruction and the second instruction, then even if one of these instructions stalls later they will remain in step and so there is no need for subsequent hazarding logic at a later stage. In contrast, if the second instruction could progress on down the pipeline even if the first instruction stalled then more complex hazarding logic between different pairs of instructions at different pipeline stages in the first and second instructions lots could be required. When a pair of instructions in the respective instruction slots remain in step throughout the pipeline, then a stall to the first instruction would also affect the second instruction, and this can be exploited to allow execution of the second instruction using the duplicated resource in the first pipeline stage even if a stall would be required to ensure its operand is available in time, when the first instruction in the other instruction slot will anyway stall by the same number of cycles or greater.

The apparatus may have hazard detection circuitry to suppress issuing of the second instruction in the second instruction slot when a hazard condition is detected between the first instruction to be processed by the first instruction slot and the second instruction. For example, this hazard condition could be a data hazard, when one of the first and second instruction specifies a destination register which is the same as a source register of the other of the first and second instructions, or it could be a functional hazard where both the first and second instructions require use of the same functional circuit unit at the same stage of the pipeline but that functional circuit unit can only handle one instruction at a time. Hence, if a hazard condition is detected which would prevent the first and second instructions being processed in parallel, the second instruction may be supressed from issuing and for the corresponding cycle only the first instruction slot may be used. In the following cycle the second instruction which hazarded may become the first instruction to be processed in the first instruction slot to allow forward progress to be made.

In summary, the second instruction slot may be an additional instruction slot which may process an additional instruction to the first in cycles when the additional instruction would not hazard with the first instruction. In cycles where a hazard is detected with the first instruction slot, the second instruction slot may not be used. On the other hand, the first instruction slot may be the main instruction slot which may be used in each cycle in which an instruction is issued. Since the first instruction may often stall for other reasons not related to skewing, this can be exploited to enable skewing of the second instruction in the second instruction slot to use the earlier instance of the duplicated processing resource when its stall penalty for doing so is less than or equal to the number of cycles by which the first instruction is already stalled.

Another situation in which the second instruction may be supressed from issuing may be if it hazards against an earlier instruction pending in the pipeline which would require the second instruction to be stalled by a greater number of cycles than the first instruction needs to be stalled. In this case, rather than delaying the first instruction, it may be more efficient to suppress issuing of the second instruction so that the first instruction can proceed faster.

The technique may be used in an out of order processing pipeline in which instructions can be processed in a different order from the program order in which they were fetched from an instruction cache or memory.

However, the technique can be particularly useful when the processing pipeline comprises an in-order processing pipeline in which processing of the instructions follows the original program order. In an in-order processing pipeline, when one instruction stalls it is not possible to process a later instruction in the meantime, and so hazards and other stalling conditions affecting one instruction may require a bubble to be inserted into the pipeline, which would lead to less efficient use of the processing resource. By controlling whether the second instruction is processed using the duplicated resource at the first or second pipeline stage using the technique above, some stall cycles can be avoided allowing a greater throughput of instructions.

The duplicated processing resource could vary from embodiment to embodiment and in general may comprise any resource required for processing an instruction which appears at more than one pipeline stage. For example, the duplicated processing resource could be an arithmetic logic unit (ALU) for performing arithmetic operations such as add, subtract, multiply, divide or square root, or logical operations such as AND, OR, NOR, XOR, etc. Another example of the duplicated processing resource could be a shifter for performing shift operations. Also, in some cases a duplicated processing resource could comprise an address generation unit for generating an address of data to be accessed in a data store such as a cache or memory. Some examples may include multiple types of duplicated resource. Although duplicating such a resource may require some additional circuitry, this can be justified if the duplication allows some instructions to be processed at an earlier stage of the pipeline when their operands can be available in time, as this can improve performance because the likelihood of future stalls can be reduced by making the result of the processing using the duplicated resource available earlier.

In some embodiments the duplicated processing resource may only be able to handle one of the instructions in the first and second instruction slots at a time, and so if the first and second instructions provided to the first and second instruction slots both require the duplicated processing resource, then either the first and second instruction slots can be controlled to use the duplicated processing resource in different ones of the first and second pipeline stages respectively, or a functional hazard could be signalled to prevent the second instruction from issuing. Alternatively, some embodiments may provide within a given one of the first and second pipeline stages sufficient circuitry for the duplicated processing resource in that pipeline stage to handle both the first and second instructions even if they both require the duplicated processing resource. For example, as well as duplicating an ALU between different pipeline stages, a given pipeline stage may also itself contain two duplicated instances of an ALU within the same stage to permit both the first and second instructions slots to simultaneously process an arithmetic or logical instruction. Since arithmetic or logical instructions may be relatively common then this duplication of circuitry may be justified.

Although the examples given herein refer to a pipeline having two instruction slots, it will be appreciated that three or more instruction slots could be provided in some embodiments and in this case the third, fourth or further instruction slots may be handled in a similar way to the second instruction slot described in the examples.

Also, while the examples show instances where there are two pipeline stages having the duplicated processing resource, it would also be possible to provide the duplicated processing resource in three or more different pipeline stages (although there may be diminishing returns in the additional performance improvement achieved with more than two stages of duplicated resource).

The first and second pipeline stages including the duplicated resource may also include at least one non-duplicated resource which is provided only in one stage of the pipeline.

In another example, a processing pipeline may support conditional instructions which control the pipeline to perform a conditional operation which is dependent on whether condition status information of the apparatus passes or fails a test condition. The apparatus may also have hazard detection circuitry for detecting hazard conditions between different instructions to be processed. If a hazard condition is detected between a given instruction and another instruction, the hazard detection circuitry may control the processing pipeline to delay processing of the given instruction. For example, delaying the given instruction may allow data hazards or functional hazards to be resolved.

However, the inventor recognised that if either the given instruction or the other instruction is a conditional instruction, it is possible that the conditional instruction may anyway fail its test condition, and if so then even if there is a hazard condition, this may not cause a problem since for example failure of the test condition may prevent the result of the conditional operation becoming valid architectural state. In this case, delaying either the conditional instruction itself or the other instruction which hazards with it may unnecessarily reduce performance. Instead, by allowing the instruction to proceed regardless of the hazard condition, this can avoid unnecessary stalls. However, even if the conditional instruction would currently fail its test condition based on the conditional status information at the time the hazard is detected, there could still be some intervening instructions which could update the conditional status information before the conditional instruction is executed. To determine whether it is safe to ignore a hazard involving a conditional instruction, the hazard detection circuitry may check for such intervening instructions.

Hence, the hazard detection circuitry when checking for hazards may detect whether either the given instruction or the other instruction being hazarded is a conditional instruction for which a current value of the condition status information status fails the test condition and there are no earlier instructions than the conditional instruction remaining which have the potential to update the condition status information. If so, then the hazard detection circuitry may allow the given instruction to proceed regardless of whether the hazard condition is detected between the given instruction and the other instruction. This can help to improve performance.

This technique exploits the fact that in practice compilers may generate program code to be executed which sets the condition status information some way in advance of the conditional instructions which use those condition status information. For example, if there are relatively long if/then/else branches, the instruction setting up the condition for evaluating the if condition may occur at least four to five instructions before the conditional branch instruction and such code sequences can benefit from the technique discussed above because any hazards involving the conditional branch instruction can be ignored to improve performance. Similarly, some conditional non-branch instructions may also have their condition status information set some way in advance of the conditional instruction itself.

The hazard condition being checked could be of a number of types. For example, a first type of hazard condition may be detected between the given instruction at a first pipeline stage of the pipeline and the other instruction at a subsequent pipeline stage of the processing pipeline. For example, the first type of hazard condition may correspond to a read after write (RAW) hazard. The hazard detection circuitry may for example detect the first type of hazard when the other instruction specifies a destination register that is the same as a source register of the given instruction. When the first type of hazard condition is detected, the hazard detection circuitry may stall the given instruction at the first pipeline stage for at least one cycle, unless either the given instruction or the other instruction is a conditional instruction for which the current value of the condition status information fails the test condition and there are no intervening instructions which could update this condition status information.

The first type of hazard condition may be relevant both for single issue pipeline which processes a single instruction per cycle and dual or multiple issue pipelines which have multiple instruction slots for processing multiple instructions in parallel.

However, in a processing pipeline having first and second instruction slots for processing at least two instructions in parallel, there may also be a second type of hazard condition detected between the given instruction in the second instruction slot and the other instruction in the first instruction slot. While the first type of hazard may be detected between later and earlier instructions pending at different pipeline stages, the second type of hazard may be detected between instructions at the same pipeline stage in the first and second instruction slots. The second type of hazard condition could be a data hazard where one of the hazarding instructions has a destination register which is the same as the source register of the other instruction, or a functional hazard where the instructions to be processed by both instruction slots require a given functional circuit unit at the same stage of the pipeline. In response to the second type of hazard condition, issuing of the given instruction in the second instruction slot may be supressed, unless the given instruction is a conditional instruction which currently would fail at test condition and for which there are no earlier instructions which could still update the condition status information. Hence, by allowing the given instruction to proceed regardless of any detected hazards when it is known that the hazard will not cause a problem due to the failure of the conditional instruction's test condition, processing performance can be improved since this may enable instructions to be dual issued using the first and second instruction slots more often and fewer pipeline stalls or bubbles may occur.

The technique of ignoring hazards for failed conditional instructions can be applied to an out of order processing pipeline, but this may require more complex circuitry for detecting whether there are intervening instructions to be executed which correspond to an earlier point in the program order than the given instruction which could still update the condition status information.

The technique is particularly useful for an in-order processing pipeline, firstly because it is simpler in an in-order pipeline to detect whether there will be any intervening updates to the condition status information, and also because in an in-order processing pipeline, when one instruction encounters a hazard then this may require at least one stall cycle which cannot be filled using a later instruction from the program order, so techniques to avoid unnecessary stall cycles can provide a greater performance improvement for an in-order pipeline.

The hazards may be detected at a given stage of the pipeline and there may still be several remaining stages of the pipeline before the point at which the condition status information would be updated in response to a condition status updating instruction. To detect whether there would be any intervening instructions which could update the condition status information, the hazard detection circuitry may receive an indication from at least one pipeline stage of the pipeline indicating whether a current instruction at that pipeline stage is a condition status updating instruction having the potential to update the condition status information. In some systems, all arithmetic or logical instructions could be condition status updating instructions. For example, after each arithmetic or logical instruction the condition status information could be updated to indicate some property of the result of that instruction, such as whether the result was zero, positive or negative, whether the result overflowed, etc. In other systems, there may be non-condition status updating versions and condition status updating versions of the same arithmetic or logical instruction, for example with a flag specified by the instruction encoding indicating whether the condition status information should be updated based on a result of that instruction. In this case, not all instructions may be condition status updating instructions. A bit of information may be passed from the relevant later pipeline stages of the pipeline to indicate whether the current instruction held in that pipeline stage is a condition status updating instruction or not. In systems where there are two or more instruction slots then each pipeline stage may provide more than one indication indicating whether each of the instructions in the different instruction slots is a condition status updating instruction.

The condition status information may be represented in different ways but in general it may comprise at least one condition flag indicative of at least one property of a previous processing result generated by the processing pipeline. For example, the condition status information may include at least one of: a negative flag indicating whether a previous processing result was negative, a zero flag indicating whether a previous processing result was equal to zero, an overflow flag indicating whether a previous processing operation triggered an overflow, and a carry flag indicating whether a previous processing result generated a carry. Such flags can be used for evaluating various test conditions such as whether one value is greater than or less than another.

FIG. 1 schematically illustrates the example of a superscalar in-order processing pipeline 2 supporting dual issue of instructions. The pipeline 2 has a decode stage 4 for decoding instructions, an issue stage 6 for issuing instructions for execution, two execute stages 8, 10 for performing processing operations in response to the instructions, and a writeback stage 12 for writing back results of the processing to registers. For example, the two execute stages 8, 10 may have different functional circuit units for carrying out various types of processing and some instructions may require processing at the first execute stage 8 and others at the second execute stage 10. Result values generated at the first or second execute stages 8, 10 may be written back to registers at the writeback stage 12, but could also be forwarded back to earlier stages of the pipeline so that they are available earlier for processing by later instructions.

The pipeline 2 has two instruction slots 14, 16 for processing two instructions in parallel, which will be referred to as slot 0 and slot 1 respectively. In each processing cycle, the next two instructions in the program order of the program being executed are identified based on a program counter 20, the next instruction to be executed is provided to slot 0 and the following instruction is provided to slot 1. At the decode stage 4, dual issuing hazarding logic 30 checks whether there is a hazard condition between the first instruction in slot 0 and the second instruction in slot 1. This could be a data hazard (e.g. a read-after-write hazard when one of the pair of instructions specifies a destination register which is the same as the source register of the other of the pair of instructions) or a functional hazard where both instructions require use of the same functional circuit unit at the same pipeline stage when there is insufficient resource to process both instructions using that functional circuit unit at a time. If a hazard is identified by the dual issue hazarding logic 30, then the slot 1 instruction is prevented from being issued and the instruction in slot 0 proceeds alone. On the other hand, if no hazard is identified between the pair of instructions to be dual-issued, then both instructions proceed to the issue stage 6.

Further hazarding logic 32 is provided at the issue stage to compare source registers of the instructions in slots 0 and 1 at the issue stage 6 against destination registers of any older instructions in the pipeline in the execute stages 8, 10 or the writeback stage 12 of either of the instruction slots 14, 16. A hazard condition is identified when the destination register of one of the instructions in the later pipeline stages 8, 10, 12 is the same as one of the source registers of the slot 0 or slot 1 instruction in the issue stage 6. If such a hazard is detected, then both the pair of instructions are stalled for at least one cycle. The number of cycles for which the instructions are stalled will depend on which of the stages 8, 10, 12 contains the instruction which hazards with the instruction at the issue stage 6. In general, enough bubbles are inserted into the pipeline to ensure that by the time the slot 0 instruction is at the stage 6, 8, 10 where the operand generated by the earlier hazarding instruction is required, that operand will be available (either by reading a register or via a forwarding path).

If a hazard occurs for the slot 1 instruction at the issue stage 6 and that slot 1 instruction requires a greater number of stall cycles than the slot 0 instruction, then the slot 1 instruction may be prevented from being issued to the execute stage 8 and instead the slot 0 instruction may proceed alone (this may result in better throughput of instructions for the program as a whole compared to delaying the slot 0 instruction for a cycle to permit the slot 1 instruction to be dual issued). On the other hand, if the slot 1 instruction's hazard requires the same number of stall cycles or fewer than the hazard for slot 0, then both the slot 0 and slot 1 instructions may be issued in parallel. Hence, in general the number of stall cycles for which the slot 0 instruction is stalled depends on hazards detected between the slot 0 instruction and subsequent instructions, and hazards between the slot 1 instruction and subsequent instructions control whether the slot 1 instruction is dual issued or held back until a subsequent cycle.

If both the slot 0 and slot 1 instructions are issued, then the program counter 20 is incremented twice so that in the next cycle a further two instructions will be passed to the decode stage 4. On the other hand, if the slot 1 instruction is prevented from issuing due to a hazard against the corresponding instruction in slot 0 or a hazard with an earlier issued instruction which requires more stall cycles to resolve than any hazard in slot 0, then the program counter 20 may be incremented by an amount corresponding to one instruction so that in the next cycle the instruction previously provided to slot 1 will now be provided to slot 0, and the slot 1 instruction for the following cycle may be the next instruction after that instruction.

As shown in FIG. 1, the pipeline may have one or more condition flags 40 which indicate a condition status of the apparatus. For example, the condition flags may indicate whether a result of a flag setting instruction was positive, zero, triggered an overflow or generated a carry. Some instructions are conditional instructions whose processing operation is dependent on whether or not the condition flags 40 satisfy a test condition specified by the instruction. For example, a conditional instruction may be provided to perform a given processing operation and update the registers based on that operation only if the condition flags 40 indicate that a previous result was positive or zero for example. This can be useful for comparing values and performing an operation dependent on the result of the comparison, for example. Other instructions may be condition updating instructions which change the condition flags dependent on a property of their processing result. Some instructions may be both a conditional instruction and a condition updating instruction in the sense that their effect on the architectural state of the processor depends on whether a test condition is satisfied by the conditional flags 40, but when the test condition is passed then the condition flags 40 are then updated based on the result of the instruction.

Figure 2:
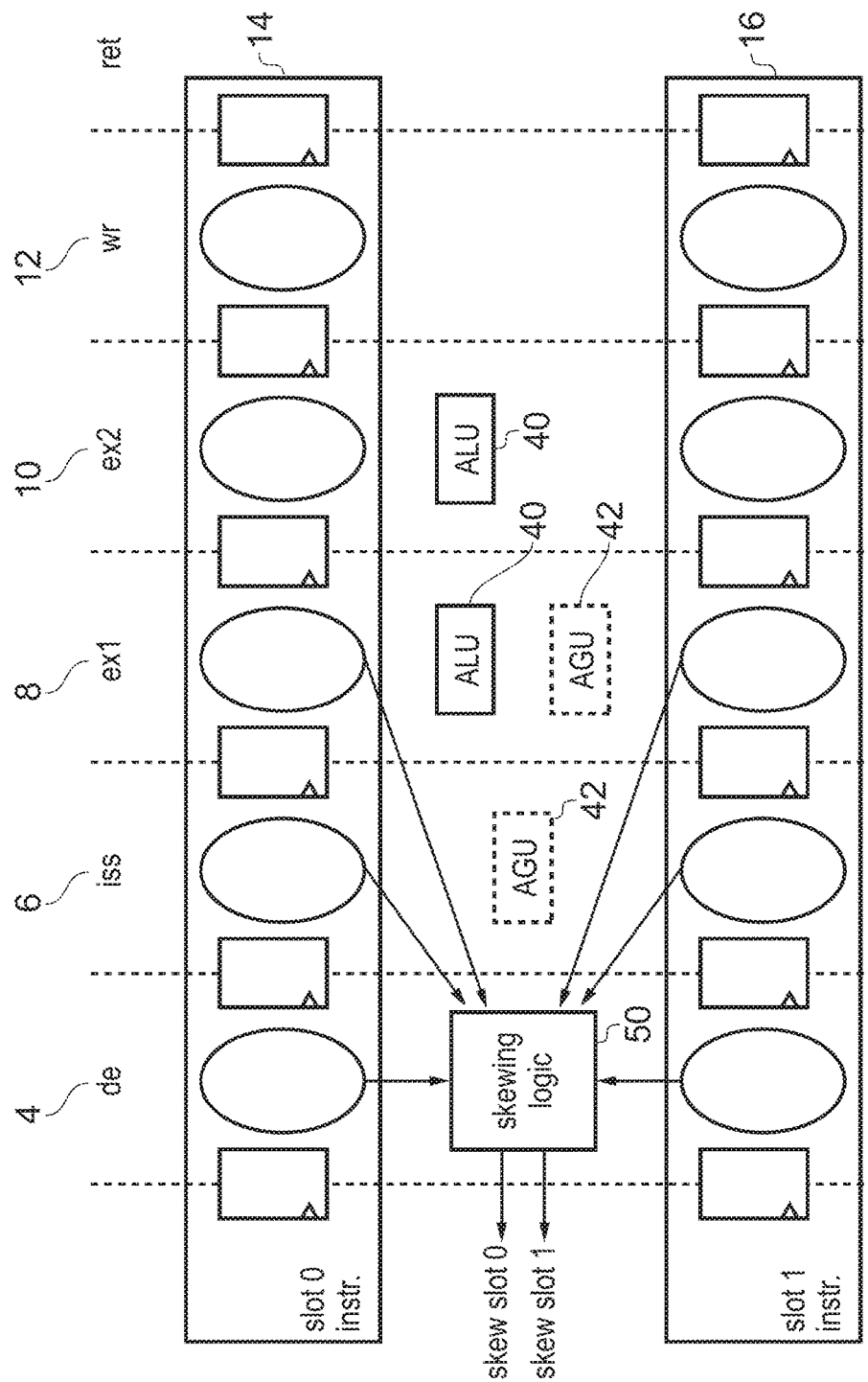
FIG. 2 shows an example of the pipeline comprising a duplicated processing resource at multiple stages of the pipeline and skewing logic for controlling whether an instruction requiring the duplicated resource should be processed using the duplicated resource at an earlier stage of the pipeline or a later stage.

FIG. 2 shows another example of some of the control logic in the pipeline 2. It will be appreciated that the logic shown in FIG. 2 may be provided in addition to the dual issue hazarding logic 30 and hazarding logic 32 shown in FIG. 1, which are not illustrated for conciseness. Elements of FIG. 2 indicated with the same reference numerals as in FIG. 1 are the same as discussed above.

As shown in FIG. 2, a certain processing resource 40, 42 may be duplicated so that it is provided in multiple pipeline stages of the pipeline 2. For example, an arithmetic logic unit (ALU) 40 may be provided in both the first and second execute stages 8, 10, or an address generating unit (AGU) 42 for generating addresses of data to be accessed in the memory can be provided at both the issue stage 6 and the execute stage 8. Another example of circuitry which could be duplicated could be shifter for carrying out a shift operation. Hence, instructions which require one of the duplicated resources can be "skewed" so that they may be executed using the duplicated resource at an earlier pipeline stage than other instructions using the later of the instances of the duplicated resource. For example, a skewed integer arithmetic instruction could be executed using the ALU 40 in the first execute stage 8 while an unskewed integer arithmetic instruction could use the ALU 40 in the second execute stage 10. Skewing an instruction can be beneficial because the results are available for forwarding earlier, so that the chances of the hazarding logic 32 detecting a data hazard with a later instruction can be reduced.

However, skewing the instruction may itself create additional hazards leading to pipeline stalls because the skewed instruction will require its input operands to be available earlier. For example, consider that the instruction under consideration at the issue stage 6 is an ADD r2, r1, #5 (i.e. it calculates r2=r1+5). If it is not skewed, it may require that the r1 input is available in the first execute stage 8, and produces its r2 result in the second execute stage 10. If it is skewed, it may require that the r1 input is available in the issue stage 6, and produces its r2 result in the first execute stage 8. Now consider an older instruction which is currently in the second execute stage 10 that is a MUL r1, r0, #3 (i.e. it calculates r1=r0*3). The MUL instruction may produce its results when it reaches the writeback stage 12, i.e. in 1 cycle from now. If the ADD is skewed, it needs r1 in the issue stage 6 (now), but r1 will be ready 1 cycle later: so a stall cycle is needed. If the ADD is not skewed, it needs r1 in the first execute stage 8 (1 cycle later) and r1 will be ready 1 cycle later, so no stall is needed. Therefore, the above sequence is an example where choosing not to skew the ADD instruction can avoid a stall cycle.

To detect when skewing is beneficial, skewing control logic 50 may be provided in the decode stage 4 to determine whether a given instruction in slot 0 or slot 1 should be skewed. For example, for an instruction which could use the ALU 40 in the first or second execute stage 8, 10 which is being processed in slot 0, the skewing logic 50 may detect whether that instruction would cause a read after write hazard with an instruction in the issue stage 6 or first execute stage 8 in either slot 0 or slot 1, and if so then the instruction is not skewed and the instruction will use the ALU 40 in the second execute stage 10 to give more time for the operand generated by that earlier instruction to become available.

On the other hand, for slot 1 while the skewing logic 50 could use the same criterion as used for slot 0, if the instruction in slot 0 is already being stalled by one or more cycles for any reason, e.g. due to a hazard detected by the hazarding logic 32, then even if a stall of a cycle or more would be required for allowing the slot 1 instruction to reach the first execute stage 8 in time for its operand to be available for processing by the ALU 40, that stall penalty may be less than or the same as the number of cycles by which the slot 0 instruction is to be stalled. In this case skewing of the slot 1 instruction may still be permitted so that the ALU 40 at the first execute stage 8 can be used. That is, for the slot 1 instruction, by computing for how many cycles the slot 1 instruction would stall if it was skewed, the skewing logic 50 may determine whether the slot 0 instruction is anyway going to stall for the same number of cycles or more, and if so permit skewing of the slot 1 instruction. This provides an advantage of increased performance because it is reasonably probable that the slot 0 instruction may encounter hazards and stall. Skewing the slot 1 instruction in such cases may lead to increased performance because future stalls can be avoided as the slot 1 results may be available earlier.

Similarly, for instructions requiring one of the duplicated AGUs 42, a skew may be permitted if the number of cycles for which the slot 1 instruction would need to be stalled in order to allow the operands to be available in time for the earlier of the two AGUs 42 in the issue stage 6 is less than or equal to the number of cycles by which the slot 0 instruction is being stalled anyway. Since the instructions in slots 0 and 1 remain in sync as pair, then if slot 0 stalls slot 1 will also stall by the same amount and therefore this stall time can be used to progress other instructions down the pipeline so that any required operand can be available in time for the earlier of the two AGUs 42.

Figure 3:
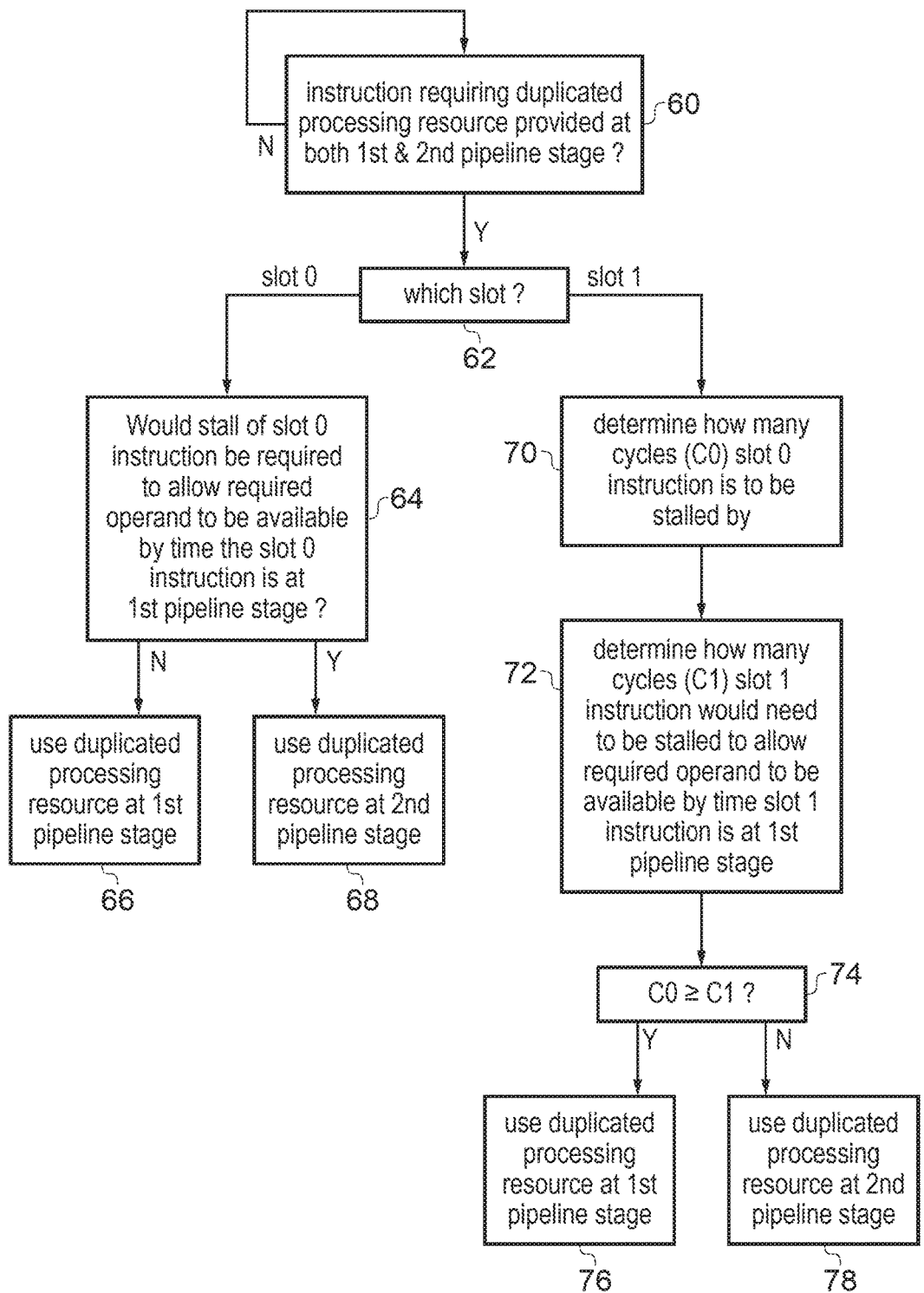
FIG. 3 shows a method of controlling handling of an instruction requiring the duplicated processing resource.

FIG. 3 shows a method of determining which instance of a duplicated processing resource provided at both a first pipeline stage and a second pipeline stage should be used to process a given instruction requiring that resource. At step 60, the skewing logic 50 determines whether an instruction requiring the duplicated processing resource has been encountered. If not, then the skewing logic waits for such an instruction. When an instruction requiring the duplicated processing resource has been encountered then at step 62 the skewing logic 50 determines which of the instruction slots 14, 16 is processing this instruction. If the instruction is in slot 0 then at 64 the skewing logic 50 determines whether a stall of the slot 0 instruction would be required to allow the required operand to be available by the time the slot 0 instruction is at the first of the pipeline stages having the duplicated resource. If not, then the slot 0 instruction can be skewed and at step 66 the pipeline is controlled to process the slot 0 instruction using the duplicated processing resource at the first pipeline stage. For example, in the case of the ALUs 40 shown in FIG. 2 the first pipeline stage would be the first execute stage 8. On the other hand, if a stall of the slot 0 instruction would be required to allow the required operand to be available in time, then at step 68 the instruction is not skewed and instead the pipeline is controlled to process the slot 0 instruction using the duplicated processing resource at the second pipeline stage (e.g. for an instruction requiring the ALU in FIG. 2, the second execute stage 10). Note that the determination at step 64 may factor in how many cycles the slot 0 instruction needs to be stalled as determined by the hazarding logic 32 shown in FIG. 1, so that if a hazard with a later instruction anyway requires a stall of at least one cycle in slot 0, this may mean that by the time the slot 0 instruction is at the first pipeline stage its operand will be available and in this case no further stall would be required to permit skewing, and so step 66 may be selected to use the duplicated processing resource at the first pipeline stage. Hence, the criterion at step 64 may check whether any additional stall is required by skewing which is not already required for other reasons such as addressing read after write hazards.

On the other hand, if at step 62 the instruction requiring the duplicated processing resource was determined to be in slot 1, then at step 70 the skewing logic 50 determines how many cycles slot 0's instruction is to be stalled by (depending on the checking of the hazarding logic 32 for example). Also, at step 72 the skewing logic 50 determines how many cycles the slot 1 instruction would need to be stalled to allow its required operand to be available by the time the slot 1 instruction is at the first pipeline stage. At step 74, the skewing logic determines whether the first number of processing cycles (C0) determined at step 70 is greater than or equal to the second number of processing cycles (C1) determined at step 72. If so, then at step 76 the skewing logic 50 allows the slot 1 instruction to be skewed and controls the pipeline to process this instruction using the duplicated processing resource at the first pipeline stage. If C0 is less than C1 then at step 78 the instruction is not skewed and the pipeline is controlled to use the duplicated processing resource at the second pipeline stage when processing this instruction.

In summary, by adding steps 70, 72 and 74 to allow skewing even if some stalling of slot 1 is required when that stall penalty is already covered by the slot 0 instruction, the slot 1 instruction can be skewed more often which helps to improve performance by allowing its results to become available earlier so that later instructions may be processed sooner with a reduced chance of a stall. While FIG. 2 shows the skewing logic being provided at the decode stage 4, in other examples it can be provided at the issue stage 6. It will be appreciated that the examples above merely show one example arrangement of pipeline stages, and other examples may have different types of stages or different numbers of execute stages for example.

Figure 4:
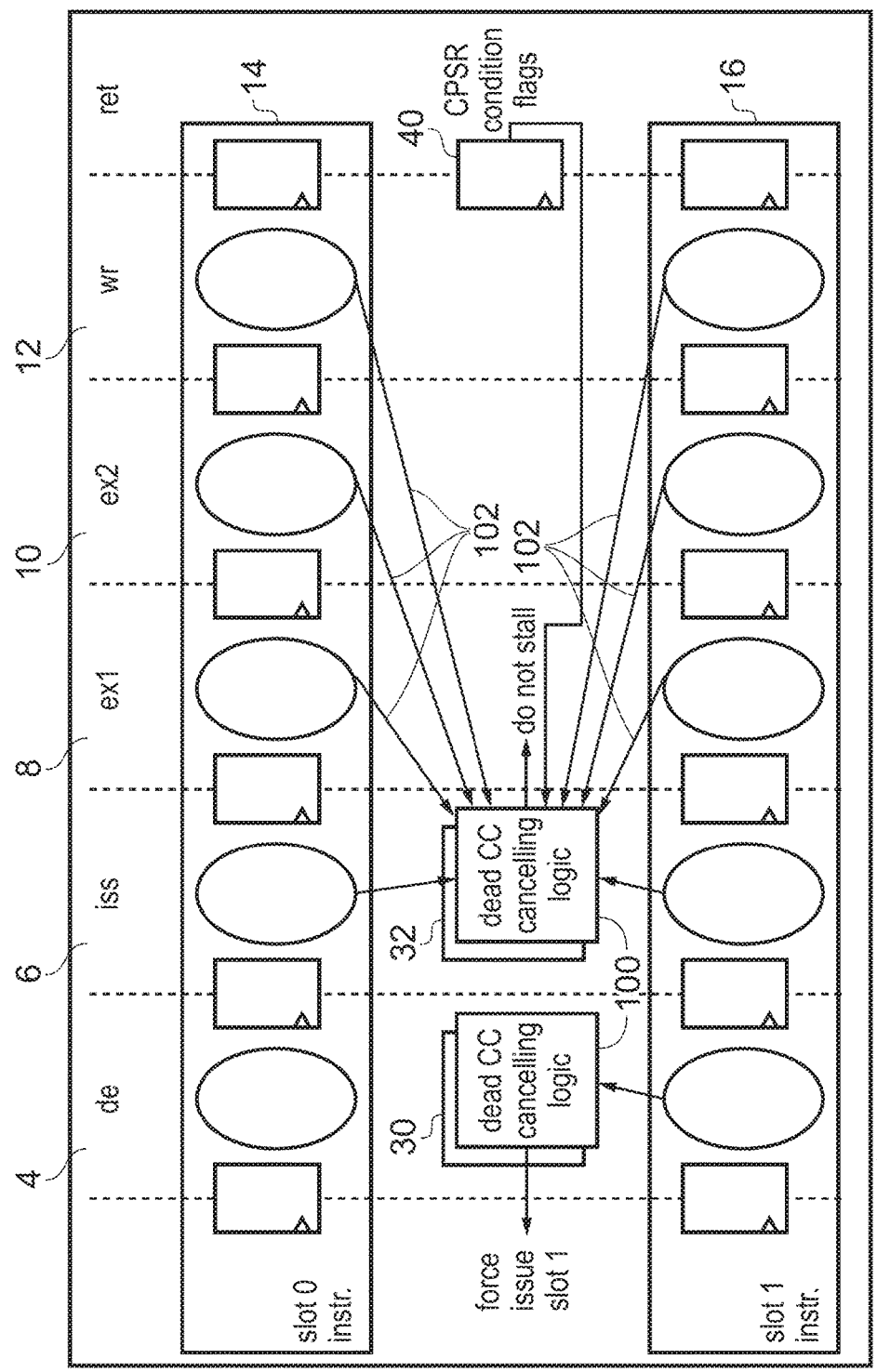
FIG. 4 shows a second example of the pipeline comprising hazard detection circuitry for which hazards are ignored if one of the hazarding instructions is a conditional instruction which fails its test condition.

FIG. 4 shows a second example of control logic provided for the pipeline 2 in addition to the dual issue hazarding logic 30 and hazarding logic 32 already discussed with respect to FIG. 1. In addition, the pipeline comprises dead conditional instruction (CC) cancelling logic 100 for detecting when a hazard detected by the dual issue hazarding logic 30 or hazarding logic 32 relates to a conditional instruction which is guaranteed to fail its test condition. The dead CC cancelling logic 100 receives indications 102 from the two execute stages 8, 10 and the writeback stage 12 indicating whether the instruction pending at that stage is a condition updating instruction which has the potential to update the condition flags 40. Note that such condition updating instructions may not always update the condition flags because, for example, their results could indicate the same condition as is already indicated by the flags 40, or the condition updating instruction may itself be conditional and could fail its test condition. Hence, the indications 102 could simply indicate whether the instructions in later stages are of a type which could potentially update the flags 40, rather than whether the instructions will definitely update the flags 40. In some systems all instructions, of a given type may be flag updating instructions, while other architectures may specify alternate flag-updating and non-flag-updating versions of the same instruction. The dead CC cancelling logic 100 receives the indications 102 of whether the later instructions are flag updating instructions from both slot 0 and slot 1 so that if there are any condition updating instructions pending in later stages of either slot then this is signalled to the dead CC cancelling logic 100.

When the dual issuing logic 30 or hazarding logic 32 detects a hazard condition which involves a conditional instruction, the dead CC cancelling logic 100 may check the current value of the condition flags 40 and determine whether the current flag values are such that the conditional instruction would fail its test condition. In isolation, this may not be enough to guarantee that that conditional instruction would definitely fail its test condition, since one of the remaining instructions in the pipeline could still update the condition flags 40. However, if the indications received from the other pipeline stages 8, 10, 12 also indicate that there are no flag-setting instructions existing in the pipeline between the conditional instruction and the retired condition flags 40, and the instruction's condition code (which identifies the test condition for the instruction) specifies that the instruction will not be executed based on the current value of the condition flags 40, then there is no need to stall any instructions due to the hazard or prevent the slot 1 instruction issuing. Instead, the instruction which would normally be stalled or prevented from issuing can proceed so that it can progress down the pipeline and make room for later instructions to be processed sooner. This is because the conditional instruction will in any case fail its condition codes and so it will not generate any valid result. By ignoring any data hazards and avoiding stalls of the pipeline because of those data hazards when the dead CC cancelling logic 100 determines that a conditional instruction will definitely fail, fewer pipeline stalls occur, increasing performance.

More particularly, in the hazarding logic 32, if either one of the slot 0 and slot 1 instructions in the issue stage 6, or one of the instructions hazarded against the issue stage instructions at subsequent stages 8, 10, 12, is a conditional instruction which is known to fail, this hazard is ignored and the pipeline does not stall because of those hazards. Similarly, at the dual issue hazarding logic 30, if the instruction in slot 1 is a conditional instruction known to fail then the hazarding logic 30 ignores any data hazard for this instruction and the instruction is dual issued anyway.

This approach is useful in a surprising number of cases because benchmarking has revealed that sometimes compilers optimise code by setting the condition flags some way in advance (e.g. 4 to 5 instructions earlier) than the conditional instructions which use the flags, and/or translate long if/then branches with streams of conditional instructions. Such code sequences can benefit from the dead CC cancelling logic 100.

Figure 5:
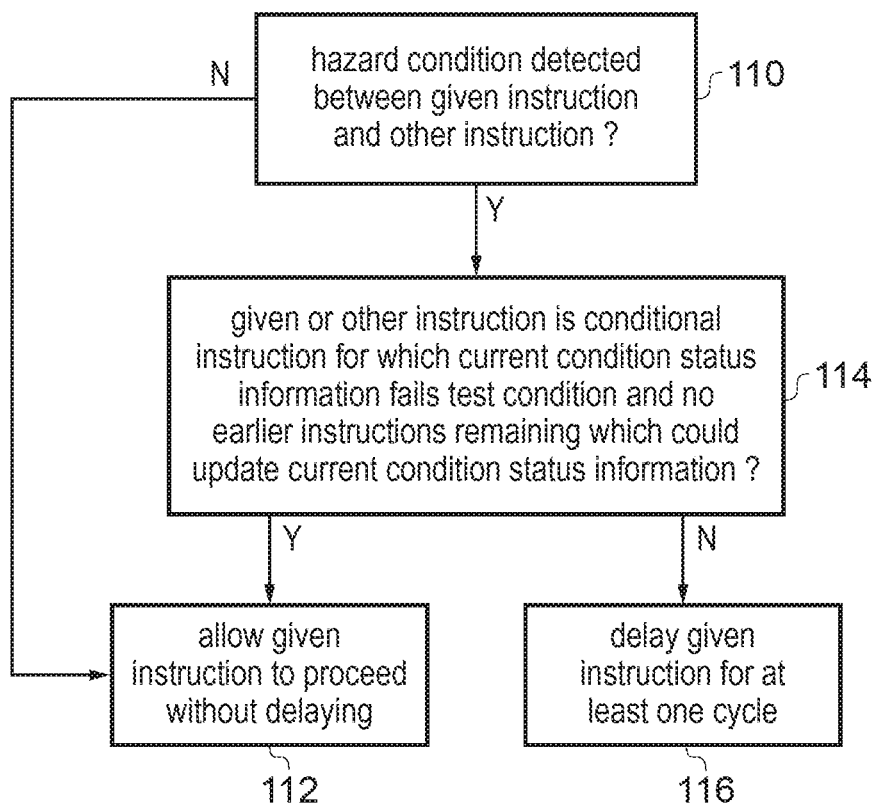
FIG. 5 shows a method of performing hazard detection.

FIG. 5 shows a method of handling data hazarding for conditional instructions. At step 110 the hazarding logic (which could be either the dual issue hazarding logic 30 or the hazarding logic 32) detects whether a hazard condition has been detected between a given instruction and another instruction. If not, then at step 112 the given instruction is allowed to proceed without a delay (e.g. for logic 30 the given instruction in slot 1 is issued in parallel with the instruction in slot 0, or for logic 32 the given instruction is issued without a stall).

If a hazard condition is detected then at step 114 the dead CC cancelling logic 100 detects whether or not the given instruction or the other instruction which hazards against the given instruction is a conditional instruction for which the current value of the condition status information (flags 40) fails the test condition specified for the conditional instruction and for which there are no earlier instructions remaining in pipeline stages 8, 10, 12 which could update the current condition status information 40. If this is the case then again at step 112 the given instruction is allowed to proceed without delay since the conditional instruction will anyway fail and the hazard would not cause incorrect processing results. However, if the criterion determined at step 114 is not satisfied then at step 116 the given instruction is delayed for at least one cycle. This could be by preventing dual issue of the slot 1 instruction or by stalling the pipeline for one or more cycles if a read after write hazard is detected for one of the instructions being compared by logic 32.

While the examples of FIG. 2 and FIG. 4 are shown as separate examples, it will be appreciated that some embodiments may use both of these techniques so that a single embodiment may have both the skewing logic 50 and the dead conditional instruction cancelling logic 100.

Another example may provide an apparatus comprising:

a processing pipeline to process instructions, wherein in response to a conditional instruction, the processing pipeline is configured to perform a conditional operation dependent on whether condition status information of the apparatus passes or fails a test condition; and hazard detection circuitry to control the processing pipeline to delay processing of a given instruction when a hazard condition is detected between the given instruction and another instruction;

wherein when the given instruction or the other instruction is a conditional instruction for which the hazard detection circuitry detects that a current value of the condition status information fails the test condition and there are no earlier instructions than the conditional instruction remaining which have the potential to update the condition status information, the hazard detection circuitry is configured to allow the given instruction to proceed regardless of whether the hazard condition is detected between the given instruction and the other instruction.

The hazard detection circuitry may be configured to detect a first type of hazard condition between the given instruction at a first pipeline stage of the processing pipeline and the other instruction at a subsequent pipeline stage of the processing pipeline.

The hazard detection circuitry may be configured to detect the first type of hazard condition when the other instruction specifies a destination register that is the same as a source register of the given instruction.

In response to the first type of hazard condition, the hazard detection circuitry may be configured to stall the given instruction for at least one cycle unless the given instruction or the other instruction is said conditional instruction for which the hazard detection circuitry detects that the current value of the condition status information fails the test condition and there are no earlier instructions than the conditional instruction remaining which have the potential to update the condition status information.

The processing pipeline may comprise first and second instruction slots to process first and second instructions in parallel.

The hazard detection circuitry may be configured to detect a second type of hazard condition between the given instruction in the second instruction slot and the other instruction in the first instruction slot.

The hazard detection circuitry may be configured to detect the second type of hazard condition when one of the given instruction and the other instruction specifies a destination register which is the same as a source register of the other of the given instruction and the other instruction.

The hazard detection circuitry may be configured to detect the second type of hazard condition when the given instruction and the other instruction both require a given processing circuit unit at a same stage of the processing pipeline.

In response to the second type of hazard condition, the hazard detection circuitry may be configured to suppress issuing of the given instruction in the second instruction slot unless the given instruction is said conditional instruction for which the hazard detection circuitry detects that the current value of the condition status information fails the test condition and there are no earlier instructions than the conditional instruction remaining which have the potential to update the condition status information.

The processing pipeline may comprise an in-order processing pipeline.

The hazard detection circuitry may be configured to receive an indication from at least one pipeline stage of the processing pipeline indicating whether a current instruction at that pipeline stage is a condition status updating instruction having the potential to update the condition status information.

The condition status information may comprise at least one condition flag indicative of at least one property of a previous processing result generated by the processing pipeline.

Another example may provide a data processing method comprising:

processing instructions using a processing pipeline, wherein in response to a conditional instruction, the processing pipeline is configured to perform a conditional operation dependent on whether condition status information passes or fails a test condition;

detecting a hazard condition between a given instruction and another instruction; and delaying processing of the given instruction when the hazard condition is detected unless the given instruction or the other instruction is a conditional instruction for which the hazard detection circuitry detects that a current value of the condition status information fails the test condition and there are no earlier instructions than the conditional instruction remaining which have the potential to update the condition status information.

Another example may provide an apparatus comprising:

means for pipelined processing of instructions, wherein in response to a conditional instruction, the means for pipelined processing is configured to perform a conditional operation dependent on whether condition status information of the apparatus passes or fails a test condition; and means for controlling the means for pipelined processing to delay processing of a given instruction when a hazard condition is detected between the given instruction and another instruction;

wherein when the given instruction or the other instruction is a conditional instruction for which the means for controlling detects that a current value of the condition status information fails the test condition and there are no earlier instructions than the conditional instruction remaining which have the potential to update the condition status information, the means for controlling is configured to allow the given instruction to proceed regardless of whether the hazard condition is detected between the given instruction and the other instruction.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments; and that various changes and modifications can be effected therein by one skilled in the art without departing from the scope and spirit of the invention as defined by the appended claims.

The invention claimed is:

1. An apparatus comprising:
 a processing pipeline comprising first and second instruction slots to process first and second instructions in parallel, the processing pipeline comprising a duplicated processing resource provided at both a first pipeline stage and a second pipeline stage subsequent to the first pipeline stage; and
 control circuitry to determine, when the second instruction to be processed by the second instruction slot requires the duplicated processing resource, whether to process the second instruction using the duplicated processing resource at the first pipeline stage or the second pipeline stage;
 wherein the control circuitry is configured to determine that the second instruction is to be processed using the duplicated processing resource at the first pipeline stage when a first number of cycles by which the first instruction is to be stalled in the first instruction slot is greater than or equal to a second number of cycles by which the second instruction would need to be stalled to allow an operand required for processing the second instruction using the duplicated processing resource to be available by the time the second instruction is at the first pipeline stage.

2. The apparatus according to claim 1, wherein the control circuitry is configured to determine that the second instruction is to be processed using the duplicated processing resource at the second pipeline stage when the first number of cycles is less than the second number of cycles.

3. The apparatus according to claim 1, wherein the control circuitry is configured to determine, when the first instruction to be processed by the first instruction slot requires the duplicated processing resource, whether to process the first instruction using the duplicated processing resource at the first pipeline stage or the second pipeline stage.

4. The apparatus according to claim 3, wherein the control circuitry is configured to determine that the first instruction is to be processed using the duplicated processing resource at the second pipeline stage when the first instruction would need to be stalled to allow an operand required for processing the first instruction using the duplicated processing resource to be available by the time the first instruction is at the first pipeline stage.

5. The apparatus according to claim 1, wherein the control circuitry is configured to identify the first number of cycles based on whether a hazard condition is detected between the first instruction and at least one earlier instruction pending in the pipeline.

6. The apparatus according to claim 1, wherein when the first instruction is stalled by the first number of cycles, the control circuitry is configured to also stall the second instruction by said first number of cycles.

7. The apparatus according to claim 1, comprising hazard detection circuitry to suppress issuing of the second instruction in the second instruction slot when a hazard condition is detected between the first instruction to be processed by the first instruction slot and the second instruction.

8. The apparatus according to claim 1, wherein the processing pipeline comprises an in-order processing pipeline.

9. The apparatus according to claim 1, wherein the duplicated processing resource comprises at least one of:
 an arithmetic logic unit to perform arithmetic and logical operations;
 a shifter to perform shift operations; and
 an address generation unit to generate an address of data to be accessed in a data store.

10. A data processing method for a processing pipeline comprising first and second instruction slots to process first and second instructions in parallel, the processing pipeline comprising a duplicated processing resource provided at both a first pipeline stage and a second pipeline stage subsequent to the first pipeline stage;
 the method comprising:
 when the second instruction to be processed by the second instruction slot requires the duplicated processing resource, determining whether a first number of cycles by which the first instruction is to be stalled in the first instruction slot is greater than or equal to a second number of cycles by which the second instruction would need to be stalled to allow an operand required for processing the second instruction using the duplicated processing resource to be available by the time the second instruction is at the first pipeline stage; and
 when the first number of cycles is greater than the second number of cycles, determining that the second instruction should be processed using the duplicated processing resource at the first pipeline stage.

11. An apparatus comprising:
 means for pipelined processing of instructions, the means for pipelined processing comprising first and second instruction slot means for processing first and second instructions in parallel, the means for pipelined processing comprising a duplicated processing resource provided at both a first pipeline stage and a second pipeline stage subsequent to the first pipeline stage; and
 means for determining, when the second instruction to be processed by the second instruction slot means requires the duplicated processing resource, whether to process the second instruction using the duplicated processing resource at the first pipeline stage or the second pipeline stage;
 wherein the means for determining is configured to determine that the second instruction is to be processed using the duplicated processing resource at the first pipeline stage when a first number of cycles by which the first instruction is to be stalled in the first instruction slot means is greater than or equal to a second number of cycles by which the second instruction would need to be stalled to allow an operand required for processing the second instruction using the duplicated processing resource to be available by the time the second instruction is at the first pipeline stage.

* * * * *